Nov. 22, 1966     R. C. ZEIDLER     3,286,803
ADJUSTMENT MECHANISM FOR CLUTCH LINKAGE
Filed May 28, 1964     4 Sheets-Sheet 1
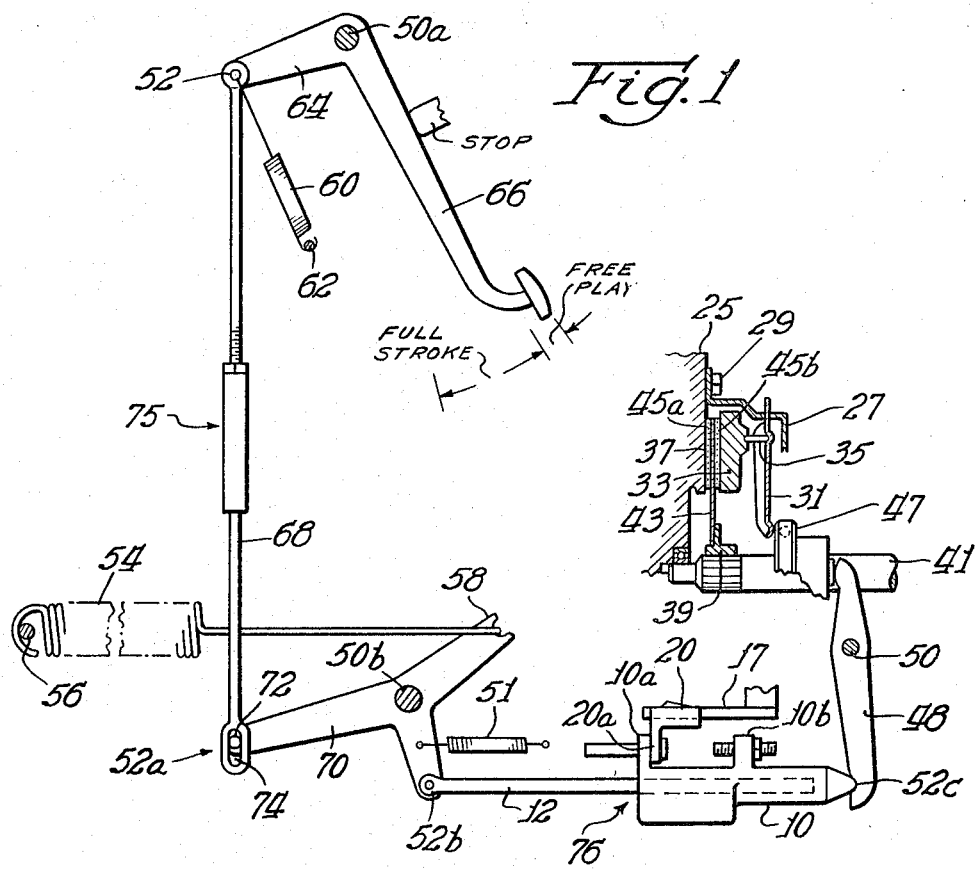
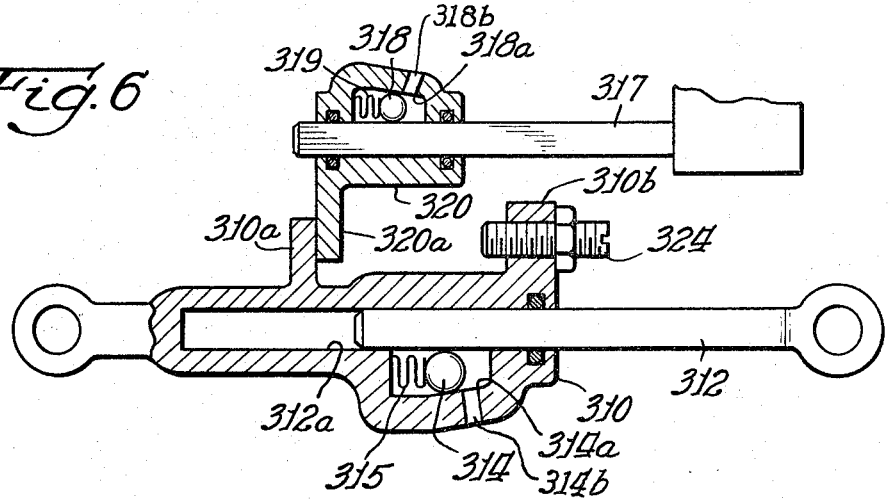
Inventor:
Reinhold C. Zeidler
By: John W Butcher, Atty

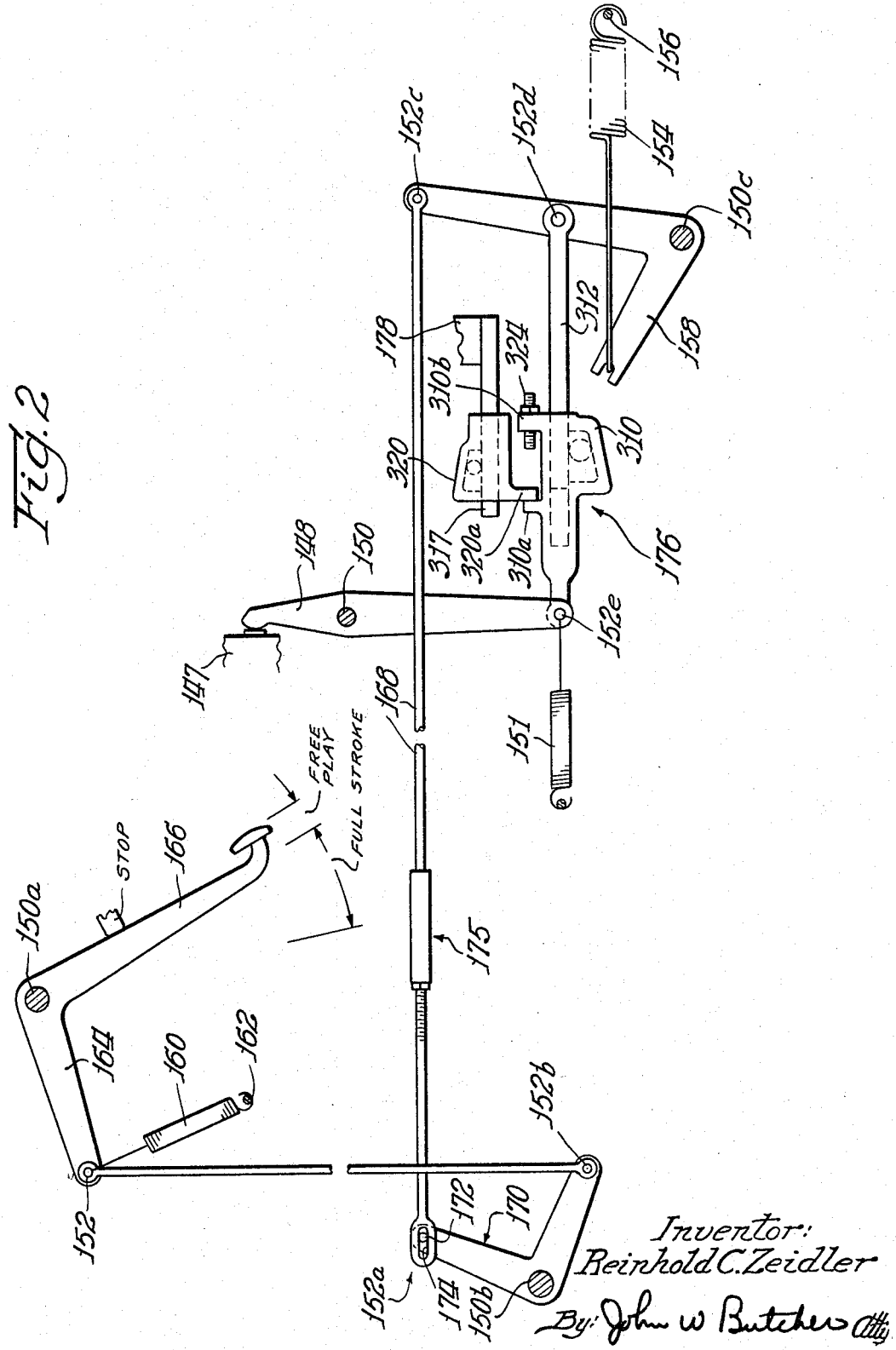

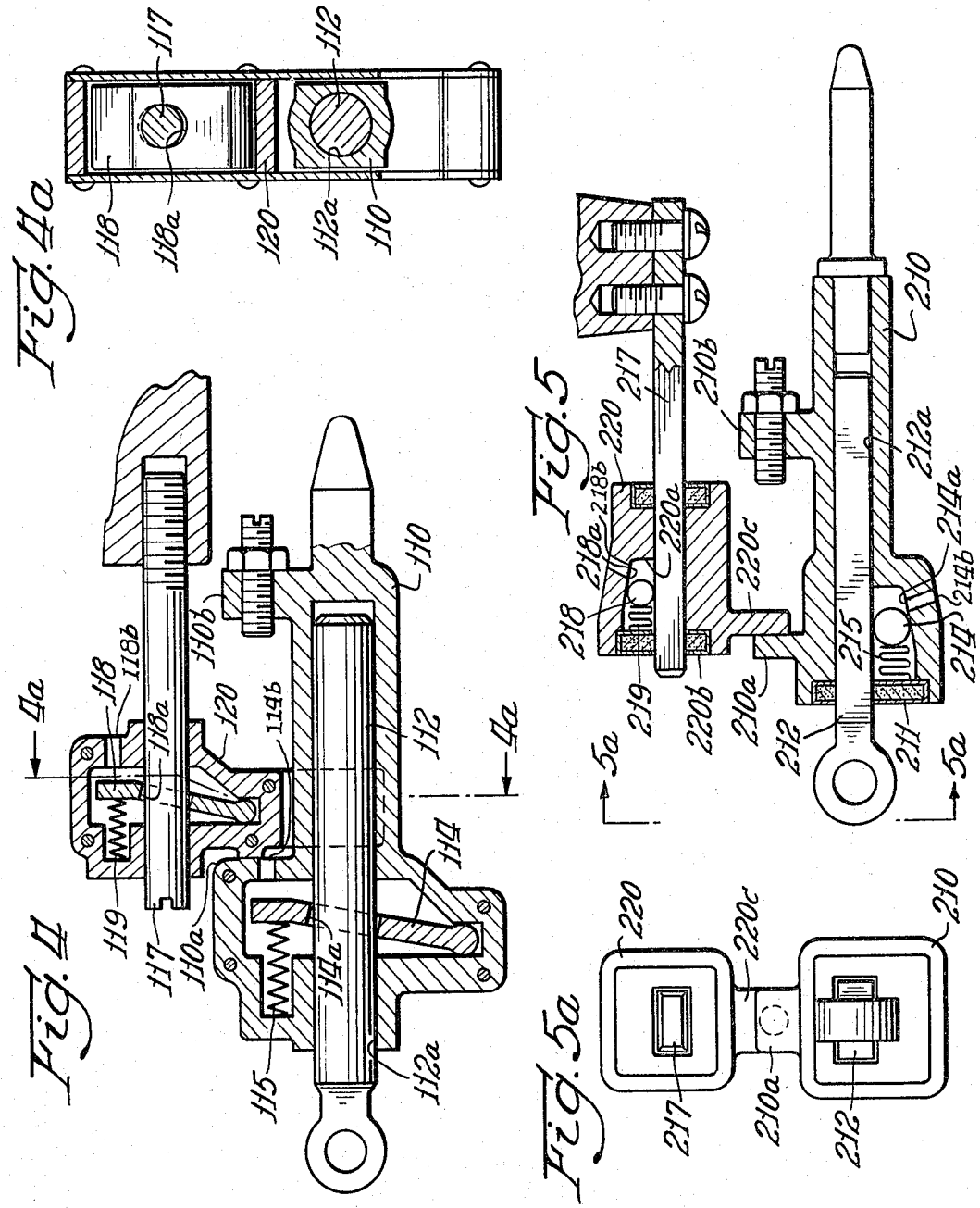

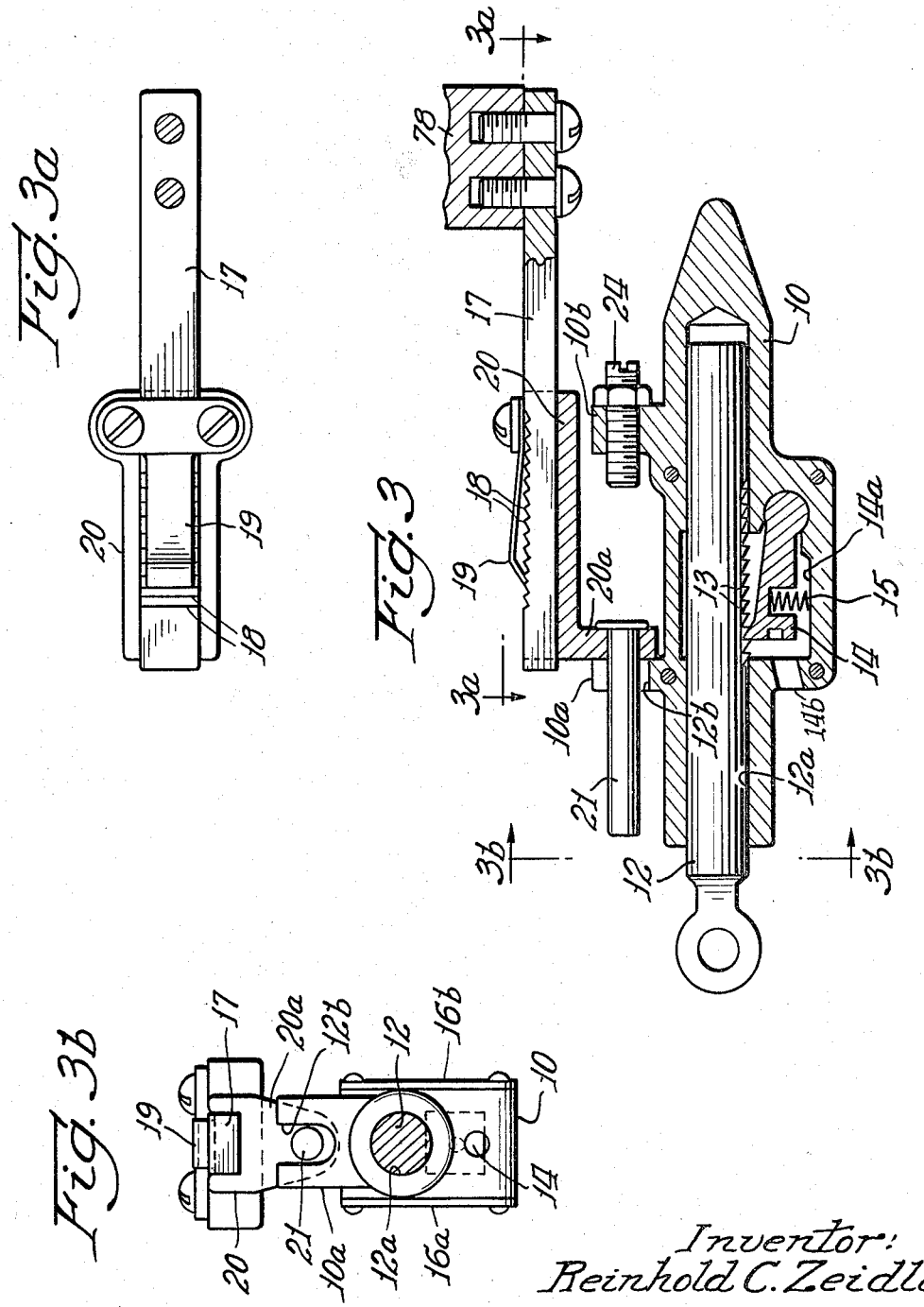

United States Patent Office 3,286,803
Patented Nov. 22, 1966

3,286,803
ADJUSTMENT MECHANISM FOR CLUTCH
LINKAGE
Reinhold C. Zeidler, Detroit, Mich., assignor to Borg-Warner Corporation, Chicago, Ill., a corporation of Illinois
Filed May 28, 1964, Ser. No. 370,837
5 Claims. (Cl. 192—111)

This invention relates to a machanism to provide for adjustment between members and more particularly to a mechanism to provide for adjustment between members of a linkage system as a function of a specific condition.

The mechanism of the present invention is particularly suitable for use in a system wherein a linkage mechanism is employed to actuate a device and wherein it becomes desirable to readjust the linkage mechanism with respect to the device being actuated to compensate for a condition such as, for example, wear. In other words, wear of the device being actuated and/or wear of the linkage members per se may result in a change in geometry of the system and dictate a need to readjust the linkage members to re-establish the original relative position of certain of the linkage members.

Briefly described, the present invention utilizes a linkage output member the movement of which is limited to a predetermined stroke by an adjustable motion limiting means. Although the stroke of the linkage output member is limited to a specific dimension, the position of the linkage output member changes relative to certain other linkage members in the system as a function of a given condition, such as, for example, wear. This change in position results in a change in the geometry of the linkage system. As the linkage output member changes its position, a predetermined increment, the linkage input member, in combination with a lost motion connection, causes at least one linkage member to over-travel another linkage member and this over-travel, in turn, changes the effective length of at least one of the linkage members. This change in effective length of one of the linkage members re-establishes the original geometry of the system.

The invention will be described in conjunction with a friction clutch member of the "remote spring" type. The description is intended to be by way of illustration and not by way of limitation. The invention finds utility in any environment wherein an output member is actuated by a linkage system and wherein the geometry of the linkage system changes in response to a given condition and wherein this change dictates a need to re-establish the original geometry of the linkage system. Particular reference is made to the drawing, in which:

FIGURE 1 is a schematic representation of a remote spring clutch and the adjustment mechanism in association with the clutch linkage system;

FIGURE 2 is a schematic representation of a remote spring clutch and an alternate embodiment of the adjustment mechanism in association with the clutch linkage system;

FIGURE 3 is a view, partially in cross-section, of one embodiment of a portion of the adjustable link and the adjustable motion limiting means associated therewith of the adjustment mechanism;

FIGURE 3a is a partial view, taken generally along line 3a—3a of FIGURE 3;

FIGURE 3b is a view taken generally along lines 3b—3b of FIGURE 3;

FIGURE 4 is a view, partially in cross-section, of a portion of an adjustable link and the adjustable motion limiting means associated therewith of an alternate embodiment of an adjustment mechanism;

FIGURE 4a is a view, partially in cross-section, taken generally along lines 4a—4a of FIGURE 4;

FIGURE 5 is a view, partially in cross-section, of a portion of an adjustable link and the adjustable motion limiting means associated therewith of another alternate embodiment of an adjustable mechanism;

FIGURE 5a is a view taken generally along lines 5a—5a of FIGURE 5;

FIGURE 6 is a view, partially in cross-section, of a portion of an adjustable link and the adjustable motion limiting means associated therewith of a further alternate embodiment of an adjustment mechanism.

Problems encountered in attempting to use a conventional clutch of the remote spring type result from the fact that the linkage system associated with the remote spring type clutch normally includes an adjustable link the length of which is adjusted manually. This is normally accomplished by a yoke and threaded rod assembly which, in effect, forms the adjustable link.

Heretofore it has been the practice to predict wear of the friction lining material as a function of diminishing free play of the clutch pedal. As the original free play diminished a predetermined amount, it was assumed there was a need to re-adjust the clutch linkage system to re-establish the original free play of the clutch pedal. The rod-yoke assembly was then adjusted to re-establish a predetermined amount of free play in the clutch pedal. This manual adjustment re-established the geometry of the clutch linkage system.

A serious disadvantage of this particular practice of adjusting the clutch is that the operator of the clutch is frequently ignorant of the fact that lack of sufficient free play in the clutch pedal is an indication that the clutch lining has worn a sufficient amount to require adjustment of the clutch. This particular type of operator would normally re-adjust the clutch only after experiencing severe clutch slippage. Generation of heat as a result of severe clutch slippage oftentimes results in considerable permanent damage to certain of the clutch elements.

The automatic adjustment mechanism provided by this invention provides for multiple adjustments of the linkage system after the clutch lining material has worn a predetermined increment. The automatic adjustment is independent of the particular quantity of free play in the clutch pedal.

Referring now to the drawing and, more particularly, FIGURE 1, a flywheel 25 is adapted to be driven by a power plant such as, for example, an internal combustion engine (not shown). The flywheel 25 carries a cover plate 27 which is mounted to the flywheel 25 in a conventional manner by bolts 29. The cover plate 27 carries clutch release levers 31 which, in turn, are connected to the pressure plate 33 by way of struts 35. A driven member 37 is positioned intermediate the pressure plate 33 and the flywheel 25. This driven member 37 includes a hub portion 39 which is drivingly mounted on a driven shaft 41. The driven member 37 may include a vibration dampener (not shown). The clutch disc 43 supports friction lining material 45a and 45b which friction lining material is interposed between the flywheel 25 and the pressure plate 33.

A clutch release bearing 47 is mounted to shift axially with respect to said driven shaft 41. A transfer lever 48 is mounted to pivot about point 50 and to shift the clutch release bearing 47 which, in turn, actuates the clutch release levers 31. The clutch linkage system includes fixed pivot members 50, 50a, 50b and movable connections 52, 52a, 52b and 52c.

A load spring 54 is grounded by way of pin 56 to the member supporting pivot shaft 50b, usually the power plant. The spring 54 is connected to an arm 58 of one link in the clutch linkage system. A clutch pedal spring 60 is connected to ground, usually the vehicle body, by way of pin 62 and engages an arm 64 which arm forms part of the clutch pedal 66.

A lost motion connection 52a is provided between pedal link 68 and transfer link 70. This lost motion connection includes pin 72 and aperture 74. The effective length of pedal link 68 may be changed by free-play adjustment means 75. The adjustable link 76 portion of the clutch linkage system includes the shaft 12 and housing 10.

Referring to FIGURE 2, the alternate embodiment of the clutch linkage system includes a clutch release bearing 147 mounted to shift axially. A transfer lever 148 is mounted to pivot about point 150 and to shift the clutch release bearing 147 which, in turn, actuates the clutch release levers (not shown). The clutch linkage system includes fixed pivot members 150, 150a, 150b and 150c and movable connections 152, 152a, 152b, 152c, 152d and 152e.

A load spring 154 is grounded by way of pin 156 to the member supporting pivot shaft 150b and is connected to an arm 158 of one link in the clutch linkage system. A clutch pedal spring 160 is connected to ground (usually the vehicle body) by way of pin 162. Spring 160 engages an arm 164 which arm 164 forms part of the clutch pedal 166.

A lost motion connection 152a is provided between pedal link 168 and transfer link 170. This lost motion connection includes a pin 172 and an aperture 174. The effective length of pedal link 168 may be changed by free-play adjustment means 175. The adjustable link 176 of the clutch linkage system includes the shaft 312 and housing 310.

Referring now to FIGURE 3, the adjustable link means includes a housing 10 having a central bore 12a formed therein and flanges 10a and 10b formed thereon. A shaft 12 is slidably positioned within the bore 12a. The shaft 12 includes teeth 13 formed on one side thereof.

The housing 10 includes a chamber 14a formed thereon which, in turn, carries a pawl 14. A resilient member 15 is interposed between the housing and the pawl and normally urges the pawl 14 into engagement with teeth 13. Side covers 16a and 16b (FIGURE 3b) may be fitted on opposite sides of the chamber 14a to exclude moisture and dirt and provide for lubrication of the pawl mechanism.

The adjustable motion limiting means includes a guide 17 fixably positioned (grounded) with respect to the clutch support member (normally the clutch bell housing or transmission). A slide member 20 is adapted to shift with respect to the guide 17 and carry with it a resilient member 19, which in turn, engages teeth 18 formed on the guide 17. The slide 20 includes a depending flange 20a and the depending flange 20a carries a guide pin 21. The guide pin 21 in combination with a slot 12b formed in the flange 10a prevents relative rotation between the housing 10 and the guide 17. The depending flange 20a provides a stop for movement of the housing 10 with respect to the guide 17 as the housing moves to the left (FIGURE 1) and as the flange 10b strikes the depending flange 20a. As the housing 10 moves to the right with respect to guide 17 and as the flange 10a strikes the depending flange 20a, the housing 10 carries the slide 20 to the right with respect to guide 17 and the resilient member 19 is carried to the next adjacent tooth 18.

The embodiment illustrated in FIGURE 4 includes a housing 110 having a central bore 112a formed therein. A shaft 112 is reciprocally positioned within the central bore 112a. The housing 110 includes stop flange 110a and a stop flange 110b. A one-way motion limiting device is associated with the housing 110 and the shaft 112. This one-way motion limiting device includes a strap 114 having an aperture 114a formed therein and a resilient member 115 interposed between the housing 110 and the strap 114. A guide pin 117 is threadably mounted within the housing which supports the clutch structure. A slide member 120 is fitted over the guide pin 117 and includes a housing which forms a chamber. A one-way motion limiting device is positioned within the chamber. This one-way motion limiting device includes a strap 118 having an aperture 118a formed therein and a resilient member 119 interposed between the housing 120 and the strap 118. The lower portion of the housing 120 is adapted to fit between the flanges 110a and 110b formed on the housing 110. As the housing 110 is shifted to the left as viewed in FIGURE 4, it is free to move to the left until flange 110b abuts the lower portion of the housing 120 at which time the one-way motion limiting device restricts movement of the housing 120 with respect to the guide pin 117 and restricts further movement of the housing 110 with respect to the guide pin 117. As the housing 110 is caused to shift to the right as viewed in FIGURE 4 and as the flange 110a abuts the lower portion of the housing 120, the housing 110 carries the housing 120 therewith causing relative movement between the housing 120 and the guide pin 117. The one-way motion limiting device is not effective to prohibit movement of the housing 120 with respect to the guide pin 117 in a direction to the right as viewed in FIGURE 4.

The embodiment illustrated in FIGURE 5 includes a housing 210 having a central bore 212a formed therein. A shaft 212 is reciprocally positioned within the bore 212a. The housing 210 includes a stop flange 210a and a stop flange 210b. A one-way motion limiting device is associated with the housing 210 and shaft 212. This one-way motion limiting device includes a roller 214, an inclined surface 214a formed in the housing 210 and a resilient member 215 interposed between an end member 211 of the housing 210 and the roller 214. A guide 217 is connected to the clutch support structure. A slide member housing 220 is fitted over the guide 217. The slide member housing 220 includes a chamber 220a. A one-way motion limiting device is positioned within the chamber 220a. This one-way motion limiting device includes a roller 218, an inclined surface 218a formed as part of the chamber 220a, and a resilient member 219 interposed between an end member 220b of the slide member housing 220 and the roller 218. The lower portion 220c of the slide member housing 220 is adapted to fit between flanges 210a and 210b of the housing 210. As the housing 210 is shifted to the left as viewed in FIGURE 5, it is free to move until flange 210b abuts the depending flange 220c at which time the one-way motion limiting device in the slide member housing 220 restricts movement of the slide member housing 220 with respect to the guide 217. This, in turn, prevents further movement of the housing 210 with respect to the guide 217. As the housing 210 is caused to shift to the right as viewed in FIGURE 5 and as the flange 210a abuts the depending flange 220c of the slide member housing 220, the housing 210 carries the slide member housing 220 therewith causing relative movement between the slide member housing 220 and the guide 217. The one-way motion limiting device in the slide member housing 220 does not prohibit movement of the slide member housing 220 with respect to the guide 217 in a direction to the right as viewed in FIGURE 5.

The embodiment illustrated in FIGURE 6 includes a housing 310 having a central bore 312a formed therein. A shaft 312 is reciprocally positioned within the central bore 312a. The housing 310 includes a stop flange 310a and a stop flange 310b. A one-way motion limiting device is associated with the housing 310 and the shaft 312. This one-way motion limiting device includes a roller 314, an inclined surface 314a formed in the housing 310, and a resilient member 315 interposed between the housing 310 and the roller 314. A guide 317 is mounted to the clutch support structure. A slide member 320 is fitted over the guide 317 and includes a housing which forms a chamber. A one-way motion limiting device is positioned within the chamber. This device includes a roller 318, an inclined surface 318a formed in the housing and a resilient member 319 interposed between the housing 320 and the roller 318. The lower portion of the housing 320 includes a depending flange 320a which fits between flanges 310a and 310b formed on the housing 310. As the housing 310 is shifted to the left as viewed in FIGURE 6, it is free to move to the left until flange 310b abuts the lower portion or depending portion 320a of housing 320 at which time the one-way motion limiting device in the housing 320 restricts movement of the housing 320 with respect to the guide 317 and this, in turn restricts further movement of the housing 310 with respect to the guide 317. As the housing 310 is caused to shift to the right as viewed in FIGURE 6, and as the flange 310a abuts the depending portion 320a, the housing 310 carries with the housing 320 therewith causing relative movement between the housing 320 and the guide 317. The one-way motion limiting device in the housing 320 does not prohibit movement of the housing 320 with respect to the guide 317 in a direction to the right as viewed in FIGURE 6.

The linkage system illustrated in FIGURE 1 utilizes an adjustable link member 76 which is in compression during the time a clutch engaging force is being transmitted from the transfer arm 70 to the release fork 48. The adjustable links illustrated in FIGURES 3, 4 and 5 are of the "compression" type and may be used in the FIGURE 1 linkage system.

The linkage system illustrated in FIGURE 2 utilizes an adjustable link member 176 which is in tension during the time a clutch engaging force is being transmitted from the arm 158 to the release fork 148. The adjustable link illustrated in FIGURE 6 is of the "tension" type and may be used in the FIGURE 2 linkage system.

It will be noted the "compression" link illustrated in FIGURE 5 and the "tension" link illustrated in FIGURE 6 utilize substantially the same mechanical elements except that the one-way motion limiting device in the housing 210 (FIGURE 5) allows for extension of the shaft 212 from the housing, whereas the one-way motion limiting device in the housing 310 (FIGURE 6) allows for retraction of the shaft 312 into the housing. It is apparent the "compression" units illustrated in FIGURES 3 and 4 may be converted to the "tension" type by making the appropriate changes in the one-way devices and in the respective ends of the link.

The linkage system in FIGURE 1 is installed and operated in the following manner:

The initial length of the adjustable link 76 is established by placing the link in the control system, connecting the load spring 54, clutch pedal spring 60, and adjuster spring 51 to their respective elements. The free-play adjustment means 75 is set to provide the requisite amount of free-play (for example, one inch) in the initial travel of the clutch pedal with the clutch fully engaged. The spring 19 of the slide member 20 is released from engagement with teeth 18 (FIGURE 3) and the slide 20 is moved to the left until the flange 20a engages flange 10a.

The pedal is displaced until the clutch is completely released and the adjustment screw 24 is shifted until it contacts the depending flange 20a of the slide 20. The lock nut is subsequently tightened to insure that the adjustment screw is fixed with respect to the flange 10b.

As lining wear occurs, the clutch release bearing 47 moves to the left as viewed in FIGURE 1; the adjustable link 76 to the right; and the lever 70 turns counter-clockwise reducing the slack in the lost motion connection and the amount of free-play at the pedal pad. The pitch of the teeth in shaft 12 and guide 17 is fine enough so that approximately .010 wear of the linings will equal the space of one tooth. This will equal about one half of the original free-play. As wear takes place, each time the clutch is engaged, the slide 20 is urged to the right. When approxmiately .010 wear occurs, the slide will have moved one tooth to the right. The spring 19 engaging the teeth 18 prevents movement of the slide to the left giving the slide an action like a one-way brake. The next time the clutch is released, with the driver depressing the pedal to a habit-formed position, the screw 24 contacts the depending flange 20a stopping movement of housing 10 while shaft 12 continues to move to the left one tooth past the pawl 14. Thus, an automatic adjustment has taken place and the adjustable link 76 has increased in length by the space of one tooth. When the clutch is re-engaged, the lever 70 moves in a counter-clockwise direction and assumes the position it had originally before wear had occurred. This restores slack and clutch free-play to the original amounts and re-establishes the original geometry through which the load spring 54 acts. This cycle repeats throughout the life of the clutch.

The linkage system in FIGURE 2 is installed and operated in the following manner:

The initial length of the adjustable link 176 is established by placing the link in the control system, connecting the load spring 154, clutch pedal spring 160, and adjuster spring 151 to their respective elements. The free-play adjustment means 175 is set to provide the requisite amount of free-play of the clutch pedal with the clutch fully engaged. The adjustment housing 320 is positioned such that the flange 320a engages flange 310a.

Clutch pedal 166 is displaced until the clutch is completely released and the adjustment screw 324 is shifted until it contacts the depending flange 320a of the slide 320. The lock nut associated with the adjustment screw 324 is tightened to insure the adjustment screw is fixed with respect to flange 310b.

As lining wear occurs, the clutch release bearing 147 moves to the left and the adjustable link 176 to the right while the rod 168 moves to the right reducing the slack in the lost motion connection 152a and the amount of free-play in the clutch pedal.

As wear takes place, each time the clutch is engaged, the flange 310a contacts the depending flange 320a and the housing 320 is urged to the right with respect to guide 317. Thus, after a predetermined increment of lining wear has occurred, the linkage 176 shifts a proportionate amount to the right. The housing 320 has an action with respect to its guide 317 similar to a one-way brake in that it is capable of being shifted to the right by flange 310a with respect to the guide 317; however, the flange 310b cannot shift the housing 320 to the left with respect to guide 317. After a predetermined amount of wear has occurred, the slack in the lost motion connection 152a diminishes a sufficient amount until it reaches a point such that as the clutch is stroked, the adjustment screw 324 contacts the depending flange 320a. This contact restricts further movement of the housing 310 with respect to the guide 317 and further movement of the pedal 166 by the driver depressing the clutch to a habit-formed position results in movement of the shaft 312 into the housing 310. This movement shortens the length of the adjustable link 176 an amout proportionate to lining wear. Upon re-engagement of the clutch, the one-way motion limiting device which is positioned between the shaft 312 and the housing 310 prevents the shaft 312 from moving out of housing 310. The change in length of the adjustable link 176 restores the slack in the lost motion connection and restores the free-play in the clutch pedal as well as re-establishes the geometry through which the load spring 154 acts.

The embodiments illustrated in FIGURES 1 and 2 provide for free-play in the clutch pedal. Although the free-play feature is a preferred embodiment of the structure, it may be eliminated by replacing the lost motion connection with a connection such as the connection 52 (FIGURE 1) and eliminating the clutch pedal stop as well as the clutch pedal spring.

Use of a motion limiting means of the type illustrated in FIGURE 3 will result in a sligt change in the position of the clutch pedal (in the engaged position) between successive re-adjustments of the adjustable link. This is due to the fact a predetermined quantity of wear is required to cause the motion limiting device to move a distance equal to the spacing of one tooth. The embodiments illustrated in FIGURES 4–6, however, result in a smaller change in the position of the clutch pedal (in the engaged position) as a result of wear in that successive re-adjustments of the adjustable link are relatively more frequent.

When assembling the adjustable link housing and the motion limiting means housing in the clutch linkage system it is normally necessary to be able to shift each of the housing members manually with respect to their corresponding shaft or guide members. In the embodiment illustrated in FIGURE 3, the adjustable link housing 10 may be shifted to the left with respect to shaft 12 by inserting a tool through the opening 14b and disengaging pawl 14 from teeth 13. The motion limiting housing 20 may be shifted to the left with respect to guide 17 by lifting the spring 19 to disengage the spring from teeth 18. In the embodiment illustrated in FIGURE 4, the adjustable link housing 110 and motion limiting means housing 120 may be shifted to the left with respect to shaft 112 and guide 117 respectively by insertion of a tool through holes 114b and 118b into engagement with straps 114 and 118 to disengage the straps from their respective shafts. In the embodiment illustrated in FIGURES 5 and 6 the rollers 214, 218 and 314, 318 may be disengaged from shafts 212, 217 and 312, 317 by inserting a tool through holes 214b, 218b and 314b and 318b and shifting the rollers to the left as viewed in these figures.

The embodiments of the motion limiting means and the adjustable link illustrated herein utilize a single flange on the motion limiting means housing and spaced apart flanges on the adjustable link housing. The arrangement of the flanges may be reversed by placing a single flange on the adjustable link housing and spaced apart flanges on the motion limiting means housing.

While certain preferred embodiments of the invention have been specifically disclosed, it is understood that the invention is not limited thereto, as many variations will be readily apparent to those skilled in the art and the invention is to be given its broadest possible interpretation within the terms of the following claims.

What is claimed is:

1. A clutch comprising a driving member; a pressure plate, cover plate, and clutch release levers operatively associated with said driving member; a driven member interposed between said pressure plate and said driving member having friction material thereon; a clutch release bearing axially shiftable with respect to said driving member; a linkage system connected to said clutch release bearing including an adjustable link; motion limiting means attached to assume a plurality of positions with respect to said driving member positioning means being manually movable and being effective to reposition said motion limiting means from one of said positions to another of said positions, said positioning means including means to limit the stroke of a portion of said adjustable link; resilient means connected to said linkage system adapted to urge said linkage system in a first direction; and manual means connected to said linkage system adapted to urge said linkage system in a second direction; said motion limiting means being movable in direct proportion to the amount of wear of said friction material to restrict the movement of a portion of said adjustable link whereby movement of said manual means results in a change in the length of said adjustable link.

2. A clutch comprising a driving member; a pressure plate, cover plate, and clutch release levers operatively associated with said driving member; a driven member interposed between said pressure plate and said driving member having friction material thereon; a clutch release bearing axially shiftable with respect to said driving member; a linkage system connected to said clutch release bearing including an adjustable link; motion limiting means associated with said linkage system being effective to limit the stroke of a portion of said adjustable link; positioning means being manually adjustable and effective to change the operative position of said motion limiting means relative to said driving member; means to adjust said stroke; resilient means operatively associated with said pressure plate to urge said pressure plate in a first direction; and manual means connected to said linkage system adapted to urge said pressure plate in a second direction; said motion limiting means being responsive to wear of said friction material to restrict the movement of a portion of said adjustable link whereby movement of said manual means results in a change in the length of said adjustable link.

3. A clutch associated with an automotive prime mover comprising a driving member; a pressure plate, cover plate, and clutch release levers operatively associated with said driving member; a driven member interposed between said pressure plate and said driving member having friction material thereon; a clutch release bearing axially shiftable with respect to said driving member; a linkage system connected to said clutch release bearing including an adjustable link; said adjustable link including a one-way motion limiting means; motion limiting means connected to said prime mover being manually shiftable with respect thereto; manual positioning means operatively associated with said motion limiting means including a one-way infinitely adjustable motion limiting means being effective to position said motion limiting means in any one of a plurality of positions; said motion limiting means including means to limit the stroke of a portion of said adjustably link; resilient means operatively associated with said lever system adapted to urge said lever system in a first direction; and manual means connected to said lever system adapted to urge said lever system in a second direction; said motion limiting means being responsive to wear of said friction material to restrict the movement of a portion of said adjustable link whereby movement of said manual means results in a change in the length of said adjustable link.

4. A clutch in combination with a vehicle power plant comprising a driving member; a pressure plate, cover plate, and clutch release levers operatively associated with said driving member; a driven member interposed between said pressure plate and said driving member having friction material thereon; a clutch release bearing axially shiftable with respect to said driving member; a linkage system connected to said clutch release bearing including an adjustable link; motion limiting means connected to said power plant including means to limit the stroke of a portion of said adjustable link means to position said motion limiting means in any of a plurality of positions with respect to said power plant; means to adjust said stroke; resilient means connected to said lever system adapted to urge said lever system in a first direction; and manual means connected to said lever system adapted to urge said lever system in a second direction; said motion limiting means being responsive to movement of said linkage system and responsive to wear of said friction material to restrict the movement of a portion of said adjustable link; said movement of said linkage system in combination with said motion limiting means being effective to change the length of said adjustable link.

5. In combination, a motion limiting means and an adjustable link, said adjustable link comprising a housing having a central bore therein, a shaft positioned within said central bore adapted to reciprocate with respect to said housing, said housing including a chamber having an inclined surface with respect to said shaft, a roller interposed between said inclined surface and said shaft, a spring in engagement with said housing and said roller to provide for engagement of said roller with said shaft and said inclined surface, housing flange means on said housing defining a space therebetween, said motion limiting means comprising a slide housing having a chamber therein and having a central bore therein, a guide within said bore supporting said slide housing, said chamber including an inclined surface with respect to said guide, a roller interposed between said inclined surface and said guide, a spring in engagement with said housing and said roller to provide for engagement of said roller with said guide and said inclined surface, and slide flange means formed on said slide housing, said slide flange means interposed between said housing flange means whereby movement of said housing in a first direction results in engagement of one of said housing flange means with said slide flange means to restrict movement of said housing with respect to said guide and movement of said housing in a second direction results in engagement of the other of said housing flange means with said slide flange means whereby said slide member is caused to shift with respect to said guide member.

References Cited by the Examiner

UNITED STATES PATENTS

| | | | |
|---|---|---|---|
| 2,002,841 | 5/1935 | Tatter | 192—111 |
| 2,275,158 | 3/1942 | Nutt | 192—89 |
| 2,421,869 | 6/1947 | Brock | 192—111 |
| 2,678,120 | 5/1954 | Binder | 192—111 |
| 2,904,137 | 9/1959 | Reisch | 188—196 |

FOREIGN PATENTS 528,169   8/1921   France.

DAVID J. WILLIAMOWSKY, *Primary Examiner.*

DON A. WAITE, *Examiner.*

B. W. WYCHE III, *Assistant Examiner.*